United States Patent [19]

Sandy et al.

[11] Patent Number: 4,649,999

[45] Date of Patent: Mar. 17, 1987

[54] METHOD FOR TREATING SUBTERRANEAN FORMATIONS WITH TEMPORARILY THICKENING SOLUTIONS

[75] Inventors: Joe M. Sandy; Gerald D. Smith, both of Duncan, Okla.

[73] Assignee: Halliburton Company, Duncan, Okla.

[21] Appl. No.: 779,736

[22] Filed: Sep. 24, 1985

[51] Int. Cl.[4] .............................................. E21B 33/13

[52] U.S. Cl. .................................... 166/295; 166/281; 252/8.554

[58] Field of Search ............... 166/273, 274, 275, 294, 166/295, 305.1, 308, 281, 283; 252/8.55 D

[56] References Cited

U.S. PATENT DOCUMENTS

| | | | |
|---|---|---|---|
| 3,378,070 | 4/1968 | Wessler et al. | 166/294 X |
| 4,202,795 | 5/1980 | Burnham et al. | 166/308 X |
| 4,477,360 | 10/1984 | Almond | 166/308 X |
| 4,524,829 | 6/1985 | Hanlon et al. | 166/275 X |
| 4,552,215 | 11/1985 | Almond et al. | 166/278 |
| 4,553,601 | 11/1985 | Almond et al. | 166/308 |

*Primary Examiner*—Stephen J. Novosad
*Assistant Examiner*—Thomas J. Odar
*Attorney, Agent, or Firm*—Robert A. Kent

[57] ABSTRACT

The present invention relates to a thermally stable crosslinked gelled fluid for use in the treatment of subterranean formations penetrated by a well bore. The fluid composition comprises a pH adjusted aqueous liquid, a gelling agent comprising a selected modified cellulose ether, a crosslinking agent comprising a zirconium IV-containing compound and any additional additives that may be present. The fluid composition is thermally stable under shear at temperatures in excess of about 200° F.

20 Claims, No Drawings

METHOD FOR TREATING SUBTERRANEAN FORMATIONS WITH TEMPORARILY THICKENING SOLUTIONS

BACKGROUND OF THE INVENTION

The present invention relates generally to methods and compositions for treating subterranean formations penetrated by a well bore, and more particularly, but not by way of limitation, to methods and compositions for temporarily plugging portions of formations penetrated by a well bore by injecting into the formations through the tubing or casing a self-thickening and thinning fluid composition.

A problem encountered in treating operations, wherein temporary plugging or blocking of a portion of a well bore is to be effected utilizing self-thickening fluid compositions is stability of the plugging gel to heat. By stability to heat is meant the retention of the increased or greater viscosity properties under the conditions of use. Such compositions to be satisfactory should be sufficiently stable to resist degeneration by the heat of the formation for a period of time sufficient to accomplish the intended purpose, that is, plugging or decreasing formation permeability for a desired period of time. The degree of stability required in any particular operation will vary with such operating variables as the type of formation being treated, the temperature of the formation, the well depth (time to pump the fluid composition down the well and into the formation), the polymer concentration of the composition, and the like.

The temperature of the formation usually has a pronounced effect on the stability of the gelled fluid compositions and, generally speaking, is one of the most important operating variables when considering stability. Increased formation temperatures usually have at least one undesirable effect. Such an effect can be degeneration of the compositions, that is, a decrease in viscosity. Thus, some compositions which would be satisfactory plugging agents in a low temperature formation might not be satisfactory in formations having higher temperatures, such as are encountered in deeper wells.

A problem which also is encountered when using thickened compositions in treating formations is the ease of removal of the treating composition after the operation is completed. Some thickened or highly viscous solutions are difficult to remove from the pores of the formation after the operation is complete. Sometimes a clogging residue can be left in the pores of the formation. This can inhibit the production of fluids from the formation and can require costly cleanup operations. It would be desirable to have gelled fluid compositions which break down to a lesser viscosity within a short time after the operation is completed.

Presently, guar gum and guar gum derivatives along with other natural gums are utilized in the preparation of viscous fluids utilized in the treatment of subterranean formations to provide adequate viscosity to the fluid when utilized at temperatures in excess of about 125° F. to about 350° F. Guar gum and the guar derivatives have the capability of being crosslinked by a variety of polyvalent metals, such as, for example, titanium, zirconium, chromium, antimony, niobium, and the like. While not entirely satisfactory, these viscosifiers form a "gelled" fluid having a viscosity greater than the uncrosslinked guar gum and derivatives. However, guar and the other gums typically contain substantial amounts, that is, from about 1.5 to in excess of 10 percent by weight of insoluble matter. The presence of such insoluble matter in a fluid is highly undesirable when the temporary blocking agent thins since it may clog the pores of the formation or the fracture.

It would appear that cellulose ethers, such as hydroxyethylcellulose, would be a viable alternative to guar gum, guar derivatives or other gums for use in gelling fluids because of its substantially lower insoluble matter content. However, such has not been the case because the cellulose ethers have generally been unable to provide gelled fluids having the necessary viscosity at elevated temperatures which can be achieved through the use of guar gum and guar derivatives. Further, hydroxyethylcellulose and its derivatives generally have not been capable of adequate crosslinking, which is a necessary prerequisite to provide sufficient viscosity levels to the fluids for more severe applications.

The present invention provides a solution for, or at least mitigates, the above-discussed problems. The present invention provides improved methods for treating subterranean formations to temporarily reduce the permeability of the formation utilizing a novel gelling agent.

SUMMARY OF THE INVENTION

The surprising discovery now has been made that a novel composition including a selected gelling agent prepared by incorporation of a pendent vicinal dihydroxy structure which assumes or is capable of assuming a cis geometry in hydroxyethylcellulose or another selected cellulose ether provides a fluid composition which can be crosslinked by a compound capable of providing zirconium (IV) ions to provide gelled fluids which exhibit shear-thermal stability at elevated temperatures of from about 150° F. to in excess of 250° F.

The gelled fluid is introduced into a subterranean formation through a well bore penetrating the formation, whereupon the crosslinking agent causes a crosslinked structure to develop in the fluid whereby the viscosity of the fluid greatly increases causing a stiff gel to form which plug or significantly reduces the permeability of at least a portion of the subterranean formation. The gelled fluid also may incorporate a breaker to facilitate controlled fluid viscosity reduction and facilitate fluid recovery or a gel stabilizer at higher temperatures to reduce the rate of degradation such that the treatment can be successfully placed in the formation.

DESCRIPTION OF THE PREFERRED EMBODIMENT

The present invention provides a method and composition for use in treating subterranean formations penetrated by a well bore. The fluid composition comprises an aqueous liquid, a novel gelling agent and a selected crosslinking agent. The fluid composition can be readily pumped into a subterranean formation utilizing conventional pumping equipment and tubular goods normally available at a wellhead.

An aqueous liquid is used to hydrate the novel gelling agent prior to crosslinking. The aqueous liquid may comprise any aqueous fluid which will hydrate the gel when contacted with the gelling agent without adversely effecting hydration of the gelling agent or the subsequent properties of the gelled fluid.

The gelling agent of the present invention comprises a derivatized cellulose ether. While the present invention will be principally described in conjunction with the use of hydroxyethyl cellulose as the cellulose ether, it should be appreciated that other cellulose ethers could be similarly utilized. For example, hydroxypropylcellulose, carboxymethylcellulose, alkyl celluloses such as methyl and ethyl cellulose, mixed ethers, such as, carboxymethylhydroxyethylcellulose and the like can be utilized under appropriate conditions.

The gelling agent of the present invention must be water soluble. As is known, hydroxyethylcelluloses having a molar substitution (MS) of from about 1.5 to about 3.5 or so are water soluble. Regardless of whether the starting material in the formation of the gelling agent is water soluble, it is satisfactory if the resulting product is water soluble. Thus, the present invention may utilize substantially any polysaccharide which is capable of incorporation of the pendent vicinal dihydroxy structure to be described hereafter.

The gelling agent of the present invention comprises a cellulose ether which is chemically modified to incorporate pendent vicinal dihydroxy groups which assume or can assume cis geometry. Hereinafter, to facilitate an understanding of the present invention, specific reference will be made to a cellulose ether comprising hydroxyethylcellulose. The incorporation of the vicinal dihydroxy groups may be achieved by reaction of the hydroxyethylcellulose with purified glycidol, which is a commercially available compound.

Glycidol derivatives or compounds such as 3-chloro-1,2-propanediol (hereinafter "CPD"), which forms glycidol in situ, also may be utilized. The use of a high purity material is desirable to minimize the impurities which can interfere with the desired performance of the resulting product. In addition, other compounds which will provide a pendent vicinal dihydroxy structure, such as, for example, 2,3-epoxy-1,4-butanediol also may be utilized.

Similarly, what will be termed herein "crude glycidol" may be employed to incorporate the desired pendent vicinal dihydroxy structure. To this end, high purity CPD is dissolved in a suitable solvent, such as, for example, ethanol, isopropanol or t-butanol; and the temperature is adjusted to about 65° F. (±4° F.). Sodium hydroxide (50% by weight aqueous solution) is added over a period of about one hour or so with cooling to maintain the temperature at about 65° F. After the addition is complete, the reaction mixture is allowed to stand at ambient conditions for about 40 minutes or so. The reaction mixture is then filtered, and the resulting filtrate may be used without further processing to react with the hydroxyethylcellulose to synthesize the gelling agents of the present invention.

The crude glycidol should be used relatively promptly after preparation, that is, within one or two days or so. Thus relatively prompt use avoids a number of undesirable reactions which otherwise can take place which could result in hydrolysis of the glycidol, polymerization thereof, and the like. Storage of the crude glycidol at low temperatures can prolong the useful life somewhat.

It should be appreciated that the reaction conditions set forth herein to produce the crude glycidol are merely exemplary. What is considered important is that the synthesis take place in essentially an organic media, other than the water associated with the addition of the sodium hydroxide. This insures that the amount of water in the crude glycidol will not be so excessive as to require further processing to reduce the water level to that desired for reaction with the hydroxyethylcellulose. It is also desirable to utilize a caustic level which will insure that essentially no sodium hydroxide will remain after completion of the reaction and to carry out the reaction at essentially ambient temperature conditions.

Still further, the pendent vicinal dihydroxy structure may be incorporated by use of an aromatic polyol wherein at least two hydroxyl groups are located on adjacent carbon atoms. This structure will be essentially equivalent to the vicinal dihydroxy structure on aliphatic alcohols which assumes, or can assume, cis geometry.

The incorporation of the pendent vicinal dihydroxy structure can be carried out by, in general, using the standard slurry techniques known for preparing cellulose ethers. However, care must be taken with the process parameters selected to insure that the resulting end product has the desired characteristics.

The basic procedure involved is summarized in the following series of equations:

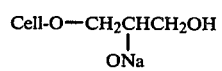

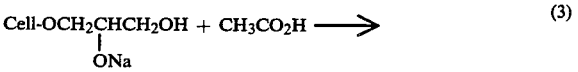

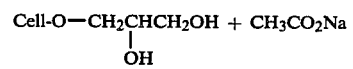

wherein "Cell" represents the cellulosic backbone.

A variety of diluents, such as, for example, alcohols, ketones and the like, and mixtures thereof are known for use in forming cellulose ethers. It is preferred to utilize acetone since polysaccharide products having improved performance characteristics have been provided. Isopropanol and t-butanol also have been found satisfactory.

The ratio of the diluent to the hydroxyethylcellulose may be varied within wide limits. The product obtained does not appear to be particularly sensitive to the ratio employed. It has been found suitable to utilize weight ratios of at least about 4:1 to about 25:1 or more, more desirably about 5:1 to about 10:1. The use of relatively high ratios of diluent to hydroxyethylcellulose tend to require longer reaction times to provide products with the requisite characteristics.

A wide variety of alkaline materials are known for use in preparing cellulose ethers and may be employed. It is preferred to utilize sodium hydroxide; however, other useful materials which may be used include, for example, potassium hydroxide and lithium hydroxide. The molar ratio of caustic/hydroxyethylcellulose may suitably vary from about 0.4:1 or lower to 0.8:1 or so, more desirably about 0.5:1 to about 0.8:1. Based upon present data, it is believed that products capable of imparting improved performance are obtained with lower caustic levels. The reaction of glycidol with hydroxyethylcellulose is catalytic so that the sodium hydroxide or other caustic used is not consumed. The amount of caustic utilized must be adequate to causticize the hydroxyethylcellulose, but increased amounts of caustic could result in increased nucleophilic attack of hydroxyl ions on glycidol, resulting in a lowering of the effective amount of glycidol available for reaction.

Cellulosics that are in contact with any base may be readily degraded by oxygen. It is accordingly necessary to exclude oxygen from the reaction vessel during the entire time in which caustic is present. It is suitable to carry out the reaction under a continuous flow of an inert gas such as nitrogen.

It is desirable to provide vigorous stirring so as to provide for more complete reaction and a more homogeneous product. Causticized cellulosics tend to be more gelatinous and viscous than normal cellulosics, and compensation for such should be kept in mind when selecting the stirring apparatus.

The reaction is carried out by adding glycidol over a period of time to a slurry of the hydroxyethylcellulose in acetone or other diluent used which contains water and the caustic. The amount of water employed should be limited to the amount needed to swell the cellulose to allow the reaction to take place since increased amounts tend to provide products having less than optimum characteristics. When acetone is employed as a diluent, the amount of water may vary from about 5 percent to at least 20 percent or more, more desirably about 7 percent to about 13 percent, based upon the total weight of the water and acetone, a level of about 10 percent or so being preferred. When using isopropanol as a diluent, the range of water that may be used is significantly narrower, an amount of about 5 percent by weight water being desirable.

While addition all at once is acceptable, the glycidol is more desirably added over a period of time at the reaction temperature and then allowed to cook-out or react until completion. The conditions during the glycidol addition should be such as to minimize catenation. It is thus more desirable to add the glycidol slowly enough to achieve efficient mixing and to have a relatively homogeneous reaction mixture so as to minimize or eliminate localized areas of relatively high glycidol concentration. The reaction is desirably carried out at a temperature in the range of from ambient conditions or so up to that of reflux conditions for the diluent system being employed. When carrying out the reaction under reflux conditions, it appears that the overall time of reaction involved is more important than the length of addition and completion, although it has been found desirable to provide an addition time of at least about one hour or so. It has been found satisfactory to use total reaction times of about 2 to about 5 hours or so under reflux conditions. The use of lower temperatures will require longer reaction times.

The amount of glycidol utilized should in a functional sense be sufficient to incorporate an adequate number of the pendent vicinal dihydroxy groups to provide, upon crosslinking, a polymer having the desired performance characteristics. Purified glycidol (that is, distilled glycidol) is a relatively expensive component, and no substantial benefits are obtained by using excessive amounts. Weight ratios of glycidol/hydroxyethylcellulose in the range of about 0.15:1 to about 0.65:1 should be suitable. A ratio of about 0.15 or so should provide a degree of substitution (DS) of about 0.3 while a ratio of 0.65:1 should provide a DS of about 1.3, assuming a 50% efficiency of incorporation of the glycidol. It has been found more desirable to utilize glycidol amounts adequate to provide a DS in the range of about 0.5 to about 1.2. A preferred derivative utilizes glycidol amounts adequate to provide a DS in the range of from about 0.7 to about 0.9.

The efficiency can be estimated by mass balance, determined by weight gain of the product corrected for the salt formed from neutralizing the product, such as, for example, sodium acetate when acetic acid is used.

In addition, the pendent vicinal dihydroxy content may be determined by a periodate oxidation as is known (*Quantitative Organic Analysis via Functional Groups*), Siggia and Hanna, Fourth Edition, 1979, John Wiley and Sons, pp.42–43). The trans-1,2-diols in the glucose units of the cellulose backbone should not interfere with the titration of the pendent dihydroxy groups. Accordingly, unlike the theoretical and mass balance MS, which measure the total glycidol incorporation into the polymer, the titrated MS measures only the glycidol incorporated which still retains the vicinal dihydroxy structure. This technique thus discriminates between the glycidol incorporated internally in the pendent chain and the glycidol incorporated at the end of the pendent chain. The titrated MS therefore measures the number of available vicinal dihydroxy crosslinking sites per anhydrogluclose unit, and is more properly considered a measure of the degree of substitution (DS). The DS values set forth herein are accordingly determined by the periodate oxidation test.

The resulting product should be neutralized, as is known, to a slightly acidic pH to provide a product stable in air. Any of a variety of acids may be employed, as is known in conjunction with the preparation of cellulose ethers. The salts which result from the neutralization should be maintained at a minimum.

The product which results may be washed and then dried to isolate the product as a powder. The particular conditions under which these steps are carried out are well known to individuals skilled in the art. As an illustrative example, it is suitable to wash with an acetone/water mixture one or more times, followed by washing, one or more times with acetone. Drying may be accomplished in a vacuum at a temperature of, for example, 122° F.

After washing, if it is desired to provide a product which has slower hydration characteristics, the polysaccharide may be treated with a dialdehyde such as glyoxal. Techniques of this type are known and may be used.

The gelling agent of the present invention is admixed with the aqueous liquid in an amount sufficient to provide a desired initial viscosity to the gelled fluid. Generally, the gelling agent should be present in an amount in excess of about 0.3 percent by weight of the aqueous liquid. Preferably, the gelling agent is present in an amount of from about 0.3 to about 4.0 percent by weight of the aqueous fluid. Most preferably, the gelling agent is present in an amount of from about 0.6 to about 1.5 percent by weight of the aqueous liquid. Gelling agent concentrations below about 0.3 percent by weight generally provide insufficient amounts of the gelling agent to provide the crosslinked fluid the desired plugging properties.

Prior to admixing the crosslinking agent with the at least partially hydrated gelling agent, the pH of the composition is adjusted to a level below about 5 and, preferably, in a range of from about 2 to about 5. Most preferably, the pH is adjusted by the addition of well known caustic or acidic agents to a pH in the range of from about 3 to about 4.5 and, even more preferably, a pH level in the range of from about 3 to about 3.5.

The pH adjustment must be effected prior to addition of the crosslinking agent to effect a suitable retardation in the crosslinking reaction whereby the fluid composition can be introduced into the desired location in a subterranean formation before the fluid becomes a stiff gel which is substantially unpumpable thereby plugging or temporarily reducing the permeability of the selected location in the formation.

The reactive compounds for reducing the pH of the aqueous solution of at least partially hydrated polymer can comprise substantially any water-soluble material that reacts with water or in the presence of water to yield acidic products that form hydrogen ions in water, such as for example, hydrochloric acid, formic, sulfuric and the like. The preferred acidic source being hydrochloric acid. The reactive compounds for increasing the pH of the aqueous solution of at least partially hydrated polymer can comprise substantially any which was water-soluble and react with water or in the presence of water to form products that increase the pH of an aqueous solution, such as sodium hydroxide, ammonium hydroxide, potassium hydroxide, sodium carbonate, sodium bicarbonate and the like.

The pH adjusted hydrated gelling agent then is admixed with a crosslinking agent to effect a retarded crosslinking of the polysaccharide and provide a shear-thermal stable fluid suitable for use in the treatment of subterranean formations. The crosslinking agent can comprise any zirconium (VI) containing compound which is soluble in the hydrated gelling agent solution and capable of forming a crosslinked structure with the gelling agent whereby the viscosity of the fluid is increased with time or an increase in temperature upon entry into the well bore and the gelled fluid exhibits shear-thermal stability at elevated temperatures of from about 150° F. to in excess of about 250° F.

Compounds which supply zirconium (IV) ions are, for example, zirconium acetylacetonate, zirconium lactate, zirconium carbonate and zirconium diisopropylamine lactate. Various of such compounds are available from companies such as: Kay Fries, Rockleigh, N.J.; Magnesium Electron, Starret, Tex.; Zirconium Technology, Gainsville, Fla. and Magnablend, Inc., DeSoto, Tex. Such compounds also are available from E.I. duPont deNemours and Company, Inc.

The crosslinking agent of the present invention generally is present in an amount of at least about 0.001 percent by weight of the aqueous liquid. Preferably, the crosslinking agent is present in an amount sufficient to provide a zirconium (IV) ion concentration of from about 20 to about 700 parts per million (ppm) and, most preferably, from about 300 to about 600 ppm.

The crosslinking agent also may include a polyhydroxyl-containing compound which functions to further retard the crosslinking rate of the gelling agent. The polyhydroxyl-containing compound can comprise, for example, glycerol, erythritol, threitol, ribitol, arabinitol, xylitol, allitol, altritol, sorbitol, mannitol, dulcitol, iditol, perseitol and the like. The polyhydroxyl-containing compound, if present, should be in an amount sufficient to retard the crosslinking rate of the crosslinked gel and provide the desirable thermal stability to the gel at temperatures of from about 150° F. to in excess of about 250° F.

In addition, so long as the particular materials employed do not adversely interfere with the crosslinking reaction, any of a variety of auxiliary agents used in conventional gelled fluids may be included. For example, friction reducers, biocides, surfactants, auxiliary thermal stabilizers, fluid loss agents, and the like are known in the art and may be employed.

The gelled fluid of the present invention is used by pumping it into a well bore traversing the subterranean formation sought to be temporarily plugged or reduced in permeability. The gel is pumped in a volume sufficient to effect the permeability reduction of the formation.

The composition may be prepared for use by mixing a predetermined quantity of the hydratable gelling agent with a quantity of water to form a hydrated gel. Any suitable conventional batch mixing apparatus may be employed for this purpose. After the gelling agent and the water have been mixed for a time sufficient to form a hydrated gel, the pH is adjusted and a quantity of crosslinking agent is mixed with the hydrated gel. The mixture then is pumped into the well bore as the retarded crosslinking reaction takes place.

Once the gelled fluid composition has been pumped into the subterranean formation and a permeability reduction has been effected whereby other desired operations such as a workover, gravel packing or fracturing operation can be and are effected, it is desirable to "break" the stiff gel into a fluid having low viscosity so that it can be either pumped or produced from the formation through the well bore. There are various means available for breaking the fluid composition of the present invention. Most of the fluids of the present invention will break into a low viscosity fluid with time and temperature. However, it is usually more desirable to have a predictable breaking time within relatively narrow limits. Therefore, breakers may be included in the fluid composition of the present invention as an optional element. Mild oxidizing agents are useful as breakers when the fluid composition is used in a relatively high temperature formation, although formation temperatures of 200° F. or greater will generally break said gelled fluid relatively quickly without the aid of an oxidizing agent. Suitable oxidizing agents are ammonium persulfate, potassium dichromate and potassium permanganate. For gels used at temperatures below about 140° F., enzymes are generally used as breakers. Suitable enzymes for such use are alpha and beta amylases, amyloglucosidase, oligoglucosidase, invertase, maltase, cellulase and hemicellulase.

In an alternative method of breaking the gelled fluid composition, the subterranean formation may be treated with any conventional acidic solution to dissolve acid soluble constituents of the formation as well as break the gel to a low viscosity fluid. This treatment may be utilized when it is desired to further increase fracture conductivity in a desired region of the formation while also effecting breaking of the gel.

The following examples are provided to illustrate the novel thermal stability and utility of the fluid of the present invention, and the invention is not to be considered as limited thereto.

To illustrate the thermal stability of the fluid of the present invention when the fluid is undergoing shear, the following tests were performed.

EXAMPLE I

To illustrate the stability of the fluid composition of the present invention in comparison to a conventional guar-containing fluid, and one prepared from a different crosslinking agent, when the fluid is undergoing shear, the following tests were performed.

A base gel is prepared by admixing a quantity of the gelling agent in tap water. The particular concentration of the gelling agent employed in each test is set forth in the following Tables. Buffers, when present, were also admixed with the base gel. The buffer and its concentration is set forth in the following tables. The gelling agent was permitted to hydrate for 1 hour. A 250 ml sample of the base gel then is placed in a Waring Blender and mixed at the maximum speed which could be obtained without resulting in significant air entrainment. The crosslinking agent then was admixed with the base gel in the quantity indicated in the following tables. A quantity of the sample then was introduced into a Model 39 Fann viscometer. The viscometer was fitted with a modified bob and 25K spring. The sample was heated in the viscometer from about ambient temperature to about 200° F. Viscosity sweeps were made initially and at the temperatures indicated in the tables. The sample was sheared at 300 rpm during the intervals between the viscosity sweeps. The apparent viscosity of the fluid then was calculated from the viscosity sweep data.

The calculated apparent viscosities at 170 sec$^{-1}$ are set forth in the following tables.

TABLE 1

Gelling agent concentration: 100 lbs/1000 gal. water
Crosslinking agent: Titanium chelate, 254 ppm Ti
Additives: 0.5 lb. NaOH, 0.25 gal. substituted amine buffer per 1000 gal water

| Temperature (°F.) | Total Time at Temperature Before Test (Min) | Apparent Viscosity at 170 sec$^{-1}$ (cp) |
|---|---|---|
| 125 | 12 | 420 |
| 150 | 14 | 776 |
| 200 | 13 | 889 |

TABLE 2

Gelling agent concentration: 100 lbs/1000 gal water
Crosslinking Agent: Zirconium compound, 448 ppm Zr
Additives: 0.5 lb NaOH, 2.3 gal 15% HCl per 1000 gal water

| Temperature (°F.) | Total Time at Temperature Before Test (Min) | Apparent Viscosity at 170 sec$^{-1}$ (cp) |
|---|---|---|
| 125 | 11 | 1135 |
| 150 | 12 | 1101 |
| 200 | 14 | 2083 |

TABLE 3

Gelling agent and concentration: 100 lbs HPG/1000 gal. water
Crosslinking Agent: 63 ppm Zr
Additives: 1 gal. 15% HCl/1000 gal. water

| Temperature (°F.) | Total Time at Temperature Before Test (Min) | Apparent Viscosity at 170 sec$^{-1}$ (cp) |
|---|---|---|
| 125 | 15 | 1254 |
| 150 | 17 | 1308 |
| 200 | 18 | 1684 |

The data set forth above clearly illustrates the superior performance of the fluid of the present invention at elevated temperatures.

EXAMPLE II

An attempt had been made to introduce a screen into a well bore and perform a gravel packing operation on a well at a depth of about 4730 feet to about 4760 feet. As a result of high fluid losses to the formation in the zone to be treated, the initial attempt to place the screen and gravel pack was unsuccessful, the fluid having failed to reach the desired location.

To reduce the permeability of the formation, the process of the present invention was utilized. Five barrels of the fluid composition of the present invention were prepared by admixing 210 gallons of 3% ammonium chloride water with 21 pounds of the gelling agent. The gelling agent was permitted to hydrate after which the pH was adjusted to about 3.5 with hydrochloric acid and caustic additions. The crosslinking agent comprising a zirconium (IV)-containing compound was admixed with the hydrated gel in a proportionate amount of 0.32 gal per 1000 gallons of fluid. The fluid was mixed in a mixing vessel for two minutes and then introduced into the well bore where it was displaced with 26 barrels of salt water to the formation experiencing fluid loss. The fluid was permitted to crosslink and form a stiff gel in the formation. The viscous gravel packing fluid then was introduced into the well bore in an amount of 2 barrels followed by 5 barrels containing gravel packing material comprising 30/40 mesh sand. This viscous gravel packing fluid then was displaced to the formation with 6 barrels of salt water followed by 19 barrels of lease crude. The well was shut-in overnight. The following day the well was flowed back and the gravel packing operation was found to be satisfactory, the fluid composition of the present invention having temporarily reduced the permeability of the formation for a sufficient time to permit placement and consolidation of the gravel pack.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:

1. A method for temporarily reducing the permeability of a subterranean formation comprising:
    preparing a fluid composition by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.3 percent by weight of said aqueous liquid, a pH-adjusting agent present in an amount sufficient to provide an initial pH to said fluid composition of below about 5 at least immediately prior to addition of a crosslinking agent and a crosslinking agent comprising a zirconium IV-containing compound present in an amount of at least about 0.001 percent by weight of said aqueous liquid; and
    introducing said fluid composition into a subterranean formation in an amount sufficient to temporarily substantially reduce the permeability of said formation.

2. The method of claim 1 wherein said crosslinking agent comprises at least one member selected from the group consisting of zirconium acetylacetonate, zirconium lactate, zirconium carbonate and zirconium diisopropylamine lactate.

3. The method of claim 1 wherein said cellulose ether prior to chemical modification is hydroxyethylcellulose.

4. The method of claim 1 wherein the DS is in the range of about 0.7 to about 0.9.

5. The method of claim 1 wherein said fluid composition is defined further to contain a propping agent.

6. The method of claim 1 wherein the pH-adjusting agent is present in an amount sufficient to provide an initial pH in the range of from about 3 to about 4.5.

7. The method of claim 1 wherein the pH-adjusting agent is present in an amount sufficient to provide an initial pH in the range of from about 3 to about 3.5.

8. A method of temporarily reducing the permeability of a subterranean formation penetrated by a well bore comprising:

preparing a fluid composition by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shearthermal stability at a temperature in excess of 200° F., said gelling agent being present in an amount in excess of about 0.3 percent by weight of said aqueous liquid, a pH-adjusting agent present in an amount sufficient to provide an initial pH to said fluid composition of below about 5 at least immediately prior to addition of a crosslinking agent and a crosslinking agent comprising a zirconium (IV)containing compound present in an amount of at least about 0.001 percent by weight of said aqueous liquid, said gelling agent being prepared by charging said cellulose ether to a diluent system including water in an amount sufficient to swell said cellulose ether to provide a slurry in an enclosed reaction vessel, adding an alkaline material in an amount sufficient to catalyze the reaction of said cellulose ether, with a reactant capable of incorporating into said cellulose ether a pendent vicinal dihydroxy structure, adding said reactant over a predetermined period of time in an amount sufficient to react with and incorporate in said cellulose ether said degree of substitution of pendent vicinal dihydroxy structure, maintaining the temperature of said slurry of cellulose ether and said reactant at a temperature in the range of from about ambient to about the reflux temperature of the diluent system during said reaction, adding acid in an amount sufficient to neutralize the modified cellulose ether to form a water soluble cellulose ether product comprising said gelling agent; and introducing said fluid composition into a subterranean formation in an amount sufficient to temporarily substantially reduce the permeability of said formation.

9. The method of claim 8 wherein said pH-adjusting agent is present in an amount sufficient to provide an initial pH in the range of from about 3 to about 4.5.

10. The method of claim 8 wherein said pH-adjusting agent is present in an amount sufficient to provide an initial pH in the range of from about 3 to about 3.5.

11. The method of claim 8 wherein said crosslinking agent comprises at least one member selected from the group consisting of zirconium acetylacetonate, zirconium lactate, zirconium carbonate and zirconium diisopropylamine lactate.

12. The method of claim 8 wherein said cellulose ether prior to chemical modification is hydroxyethylcellulose.

13. The method of claim 8 wherein the DS is in the range of about 0.7 to about 0.9.

14. The method of claim 8 wherein said gelling agent is present in an amount of from about 0.6 to about 1.5 percent by weight of said aqueous fluid.

15. The method of claim 8 wherein said gelling agent is present in an amount of from about 0.3 to about 4.0 percent by weight of said aqueous fluid.

16. The method of claim 15 wherein said crosslinking agent includes a polyhydroxyl-containing compound selected from the group consisting of glycerol, erythritol, threitol, ribitol, arabinitol, xylitol, allitol, altritol, sorbitol, mannitol, dulcitol, iditol and perseitol.

17. The method of claim 16 wherein said polyhydroxyl-containing compound is present in an amount of from about 0.001 to about 0.25 percent by weight of said aqueous liquid.

18. A method for temporarily reducing the permeability in or around a well bore penetrating a subterranean formation comprising:

preparing a fluid composition by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.3 percent by weight of said aqueous liquid, a pH-adjusting agent present in an amount sufficient to provide an initial pH to said fluid composition of below about 5, a crosslinking agent comprising a zirconium IV-containing compound present in an amount of at least about 0.001 percent by weight of said aqueous liquid, and a breaker present in an amount of at least about 0.1 pound per 1000 gallons of aqueous liquid;

introducing said fluid composition into a subterranean formation through said well bore;

temporarily substantially reducing the permeability of at least a portion of said formation contacted by said fluid introduced within said well bore by crosslinking of said gelling agent to form a high viscosity gel; and breaking said high viscosity gel to a viscosity similar to that of water to substantially restore said reduced permeability.

19. The method of claim 15 wherein said crosslinking agent comprises at least one member selected from the group consisting of zirconium acetylacetonate, zirconium lactate, zirconium carbonate and zirconium diisopropylamine lactate and said cellulose ether is hydroxyethylcellulose.

20. The method of claim 15 wherein said breaker comprises at least one member selected from the group of sodium persulfate, ammonium persulfate, potassium permanganate and enzymes.

* * * * *